United States Patent
Hoshino

(10) Patent No.: US 9,346,481 B2
(45) Date of Patent: May 24, 2016

(54) STEERING COLUMN DEVICE

(75) Inventor: Shigeru Hoshino, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 49 days.

(21) Appl. No.: 14/396,479

(22) PCT Filed: Jul. 23, 2012

(86) PCT No.: PCT/JP2012/068568
§ 371 (c)(1),
(2), (4) Date: Oct. 23, 2014

(87) PCT Pub. No.: WO2014/016886
PCT Pub. Date: Jan. 30, 2014

(65) Prior Publication Data
US 2015/0090066 A1    Apr. 2, 2015

(51) Int. Cl.
*B62D 1/19*    (2006.01)
(52) U.S. Cl.
CPC ..................... *B62D 1/195* (2013.01)
(58) Field of Classification Search
CPC .................. B62D 1/19; B62D 1/195
See application file for complete search history.

(56) References Cited

U.S. PATENT DOCUMENTS

2012/0187669 A1*    7/2012    Minamigata ........... B62D 1/195
                                                  280/777

FOREIGN PATENT DOCUMENTS

| JP | 2007-283826 A | 11/2007 |
| JP | 2010-228469 A | 10/2010 |
| JP | 2012-131444 A | 7/2012 |

OTHER PUBLICATIONS

International Search Report issued Oct. 23, 2012 in PCT/JP2012/068568 filed Jul. 23, 2012.

* cited by examiner

*Primary Examiner* — Ruth Ilan
(74) *Attorney, Agent, or Firm* — Oblon, McClelland, Maier & Neustadt, L.L.P

(57) ABSTRACT

A steering column device including a first bracket for supporting a column tube that supports a steering shaft, a second bracket coupled to the first bracket and assembled onto a vehicle body, and a disengaging mechanism provided on the second bracket that allows the column tube to be disengaged from the vehicle body forward along a column axis direction under a set load when a secondary impact is caused with a collision of a vehicle. The first bracket and the second bracket are coupled to each other through an intermediation of a coupling mechanism in a relatively rotatable manner, and a rotation center of relative rotation intersects an axis center of the steering shaft. The first bracket and the second bracket perform relative rotation when an external force exceeding a predetermined value is applied to the disengaging mechanism along the column axis direction before the first bracket, the second bracket, the disengaging mechanism are assembled onto the vehicle body.

2 Claims, 5 Drawing Sheets

STEERING COLUMN DEVICE

TECHNICAL FIELD

The present invention relates to a steering column device applicable to a vehicle, and more particularly, to a steering column device including a first bracket for supporting a column tube that supports a steering shaft in a freely rotatable manner, a second bracket coupled to the first bracket and assembled onto a vehicle body so as to fix the column tube onto the vehicle body, and a disengaging mechanism provided on the second bracket and configured to allow the column tube to be disengaged from the vehicle body forward along a column axis direction under a set load when a secondary impact is caused in the event of collision of a vehicle, in which the first bracket, the second bracket, the disengaging mechanism, and the like are integrated with one another (formed into a subassembly) under a state before the steering column device is assembled onto the vehicle body.

BACKGROUND ART

The steering column device including the first bracket, the second bracket, the disengaging mechanism, and the like and applicable to the vehicle is disclosed in, for example, Patent Literature 1. In the steering column device disclosed in Patent Literature 1, the first bracket, the second bracket, the disengaging mechanism, and the like are sometimes integrated with one another (formed into a subassembly) and transported under a state before the steering column device is assembled onto the vehicle body. At the time of transportation and the like of the first bracket, the second bracket, the disengaging mechanism, and the like, an external force (load) may be applied to the disengaging mechanism provided on the second bracket.

CITATION LIST

Patent Literature

[PTL 1] JP 2007-283826 A

SUMMARY OF INVENTION

Incidentally, as described above, at the time of transportation and the like of the first bracket, the second bracket, the disengaging mechanism, and the like, in a case where the external force (load) is applied to the disengaging mechanism provided on the second bracket, when the external force (load) is a load affecting disengagement performance of the disengaging mechanism but external damage to the disengaging mechanism caused by the external force (load) is small, a displacement amount of an assembling position of the disengaging mechanism with respect to the second bracket is sometimes small. In this case, due to the above-mentioned small displacement amount, the disengaging mechanism, the second bracket, and the like are assembled onto the vehicle body with no trouble. Although there is a risk in that the disengaging mechanism is not normal, the second bracket may be assembled onto the vehicle body through an intermediation of the disengaging mechanism. Therefore, in order to ensure reliability of the steering column device (in order to secure the disengagement performance of the disengaging mechanism), all of the steering column devices need to undergo inspection for the disengaging mechanism immediately before each steering column device is assembled onto the vehicle body, and hence productivity of the steering column device is deteriorated.

The present invention has been made to achieve the above-mentioned objects (to ensure reliability of the steering column device and enhance productivity).

According to one embodiment of the present invention, there is provided a steering column device, including:

a first bracket for supporting a column tube that supports a steering shaft in a freely rotatable manner;

a second bracket coupled to the first bracket and assembled onto a vehicle body so as to fix the column tube onto the vehicle body; and a disengaging mechanism provided on the second bracket and configured to allow the column tube to be disengaged from the vehicle body forward along a column axis direction under a set load when a secondary impact is caused in the event of collision of a vehicle, the first bracket, the second bracket, the disengaging mechanism, and the like being integrated with one another under a state before the steering column device is assembled onto the vehicle body, in which the first bracket and the second bracket are coupled to each other through an intermediation of a coupling mechanism in a relatively rotatable manner, in which a rotation center of relative rotation, which is performed in the coupling mechanism, is set so as to intersect an axis center of the steering shaft, and in which the coupling mechanism is set so as to allow the first bracket and the second bracket to perform relative rotation when an external force exceeding a predetermined value is applied to the disengaging mechanism along the column axis direction under a state before the first bracket, the second bracket, the disengaging mechanism, and the like are assembled onto the vehicle body.

According to the steering column device of one embodiment of the present invention, at the time of transportation and the like under a state in which the first bracket, the second bracket, the disengaging mechanism, and the like are integrated with one another, in a case where the external force (load) is applied to the disengaging mechanism, when the external force (load) acts along the column axis direction and exceeds the predetermined value (for example, a load value affecting disengagement performance of the disengaging mechanism), the coupling mechanism allows the first bracket and the second bracket to perform relative rotation. Accordingly, even when external damage to the disengaging mechanism caused by the external force (load) is small, a displacement amount (relative rotation amount) of an assembling position of the second bracket with respect to the first bracket can be added to a displacement amount of an assembling position of the disengaging mechanism with respect to the second bracket, and thus it is possible to increase a displacement amount of the assembling position of the disengaging mechanism with respect to the first bracket.

Thus, the relative rotation of the first bracket and the second bracket can prevent the second bracket from being assembled onto the vehicle body through the intermediation of the disengaging mechanism, and hence a disqualified device can be easily distinguished from qualified devices. Therefore, there is no need to inspect all of the steering column devices for the disengaging mechanism immediately before each steering column device is assembled onto the vehicle body in order to ensure the reliability of the steering column device (in order to secure the disengagement performance of the disengaging mechanism). Thus, the productivity of the steering column device can be enhanced.

When carrying out the present invention as described above, the predetermined value may be set to be lower than a load value affecting disengagement performance of the disengaging mechanism. In this case, the relative rotation of the first bracket and the second bracket allowed by the coupling mechanism can prevent the load affecting the disengagement performance of the disengaging mechanism from being applied to the disengaging mechanism. Therefore, even in a case where the first bracket and the second bracket perform relative rotation at the coupling mechanism, the first bracket and the second bracket are returned to an original state (state before performing relative rotation), and thus the steering column device can be used as a qualified device as it is. Accordingly, the reliability of the steering column device can be ensured, and the productivity of the steering column device can be enhanced. Note that, in this case, a reference value (appropriately settable value) may be set for a relative rotation amount of the first bracket and the second bracket at the coupling mechanism, and the steering column device may be distinguished as a disqualified device when the relative rotation amount exceeds the reference value.

DESCRIPTION OF EMBODIMENTS

Figure 1:
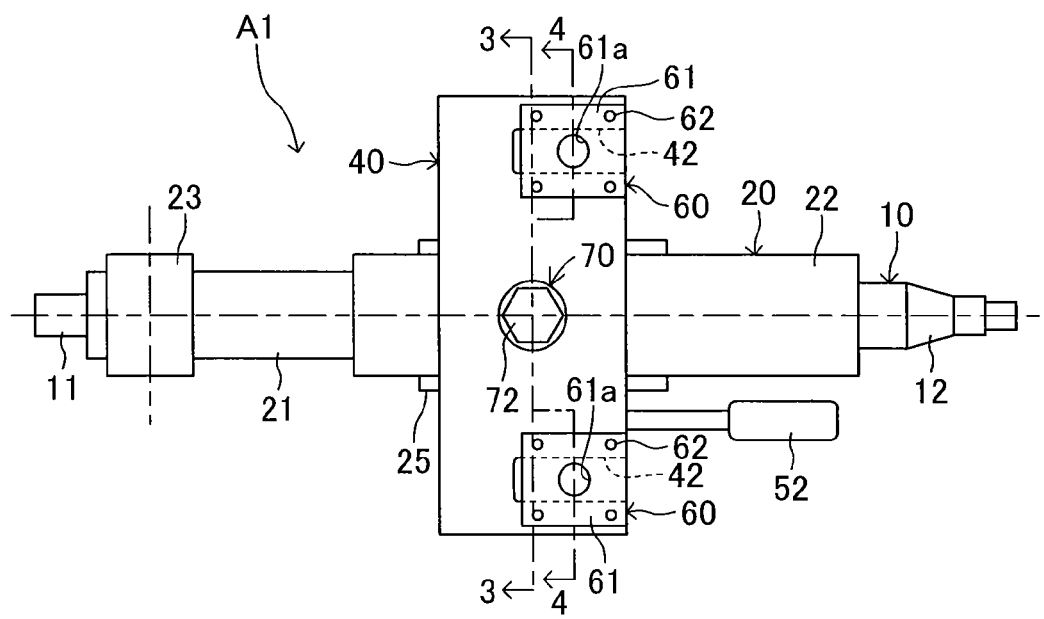
FIG. 1 is a schematic plan view of a steering column device according to a first embodiment of the present invention.

Now, embodiments of the present invention are described with reference to the drawings. FIGS. 1 to 4 schematically illustrate a steering column device according to a first embodiment of the present invention. A steering column device A1 according to this embodiment includes a column tube 20 for supporting a steering shaft 10 in a freely rotatable manner, a first bracket 30 for supporting the column tube 20 so that the column tube 20 is adjustable in its position (adjustable in tilting and telescoping thereof), and a second bracket 40 coupled to the first bracket 30 and assembled onto a vehicle body B1 (see FIG. 4). Further, the steering column device A1 includes a locking device 50 interposed between the column tube 20 and the first bracket 30, and disengaging mechanisms 60 respectively provided on portions (right and left end portions) of the second bracket 40 to be assembled onto the vehicle body B1, and also includes a coupling mechanism 70 for coupling the first bracket 30 and the second bracket 40 to each other in a relatively rotatable manner.

The steering shaft 10 includes a lower shaft 11 and an upper shaft 12. The lower shaft 11 and the upper shaft 12 are extensible and contractible in a column axis direction, and are coupled to each other so as to allow torque transmission. The lower shaft 11 is supported by a lower tube 21 of the column tube 20 in a rotatable manner, and is configured to be coupled to a steering gear box (not shown) at a lower end (left end of FIG. 1) of the lower shaft 11 under a state in which the steering column device A1 is assembled onto the vehicle body B1. The upper shaft 12 is supported by an upper tube 22 of the column tube 20 in a rotatable and axially immovable manner, and is configured to be integrally coupled to a steering wheel (not shown) at an upper end (right end of FIG. 1) of the upper shaft 12 under a state in which the steering column device A1 is assembled onto the vehicle body B1.

The column tube 20 includes the lower tube 21 assembled onto a part B1a of the vehicle body B1 at a lower end (left end of FIG. 1) of the lower tube 21 through an intermediation of a lower bracket 23 with a coupling shaft 24 so as to be tiltable (rotatable) in an up-and-down direction, and the upper tube 22 coupled to the lower tube 21 so as to be extensible and contractible in the column axis direction. The lower tube 21 is provided integrally with the lower bracket 23, and the lower bracket 23 has a mounting hole 23a (through which the coupling shaft 24 is insertable) formed therein. The upper tube 22 is provided integrally with a distance bracket 25, and is fixed, in a releasable manner, to the first bracket 30 with the distance bracket 25 through an intermediation of the locking mechanism 50. Note that, the distance bracket 25 is formed into a U-shape, and telescoping elongate holes 25a extending in the column axis direction are formed in right and left side walls of the distance bracket 25 illustrated in FIG. 3, respectively.

The first bracket 30 is formed into an inverted U-shape. In right and left side walls of the first bracket 30 illustrated in FIG. 3, circular-arc elongate holes (tilting elongate holes) 31 are respectively formed so as to extend in the up-and-down direction with a rotation center of the lower bracket 23 (an axis of the coupling shaft 24) being set as a center of the circular arc (see FIG. 3). Further, a circular mounting hole 32 is formed in a center of an upper wall of the first bracket 30, and a nut 71 is fixed onto a lower surface at the center of the upper wall of the first bracket 30 so as to correspond to the mounting hole 32 (see FIGS. 2 to 4).

The second bracket 40 is formed into a shape elongating in a right-and-left direction under a state in which the steering column device A1 is assembled onto the vehicle body B1, and a circular mounting hole 41 is formed in a center of the second bracket 40 in the right-and-left direction. Further, U-shaped cutouts 42 that are open to the right side of FIG. 1 (vehicle rear side when assembled onto a vehicle) are formed in right and left end portions of the second bracket 40, respectively. The second bracket 40 is coupled, at a center portion thereof, to the center of the upper wall of the first bracket 30 with the coupling mechanism 70 in a relatively rotatable manner. Further, a capsule 61 of each of the disengaging mechanisms 60 is assembled onto each of the right and left end portions of the second bracket 40 with four resin pins 62 so as to correspond to each of the cutouts 42.

The locking device 50 itself is a publicly-known device. The locking device 50 includes a non-rotatable bolt 51 extending in the right-and-left direction while being inserted through the telescoping elongate holes 25a formed in the distance bracket 25 and through the tilting elongate holes 31 formed in the first bracket 30, an operation lever 52 assembled onto a left end portion of the bolt 51 illustrated in FIG. 3 and operable to pivot in the up-and-down direction, a cam unit 53 assembled onto the bolt 51 at a position between the operation lever 52 and the first bracket 30 and configured to move the bolt 51 in a bolt axis direction along with the pivot of the operation lever 52 so as to be capable of fixing and unfixing the distance bracket 25 and the first bracket 30, and a nut 54 threadedly fixed onto the bolt 51 so as to fix the operation lever 52 and the cam unit 53. Note that, under a state in which the locking device 50 is locked, even if a secondary impact is caused in the event of collision of the vehicle under a state in which the steering column device A1 is assembled onto the vehicle body B1, the distance bracket 25 does not move relative to the first bracket 30.

Under a state in which the steering column device A1 is assembled onto the vehicle body B1, each of the disengaging mechanisms 60 allows the second bracket 40 to be disengaged from the vehicle body B1 forward along the column axis direction (that is, allows the column tube 20 to be disengaged from the vehicle body B1 forward along the column axis direction) under a set load (disengagement load F1) when the secondary impact is caused in the event of collision of the vehicle. Each of the disengaging mechanisms 60 includes the capsule 61 and the resin pins 62 that are to be assembled onto the second bracket 40 before the steering column device A1 is assembled onto the vehicle body B1 and before the second bracket 40 is assembled onto the first bracket 30, and also includes a bolt 64 (see FIG. 4) that is to be threadedly fixed onto a nut 63 (which is fixed to the vehicle body B1 in advance) through a through-hole 61a formed in the capsule 61 when the steering column device A1 is assembled onto the vehicle body B1.

Figure 2:
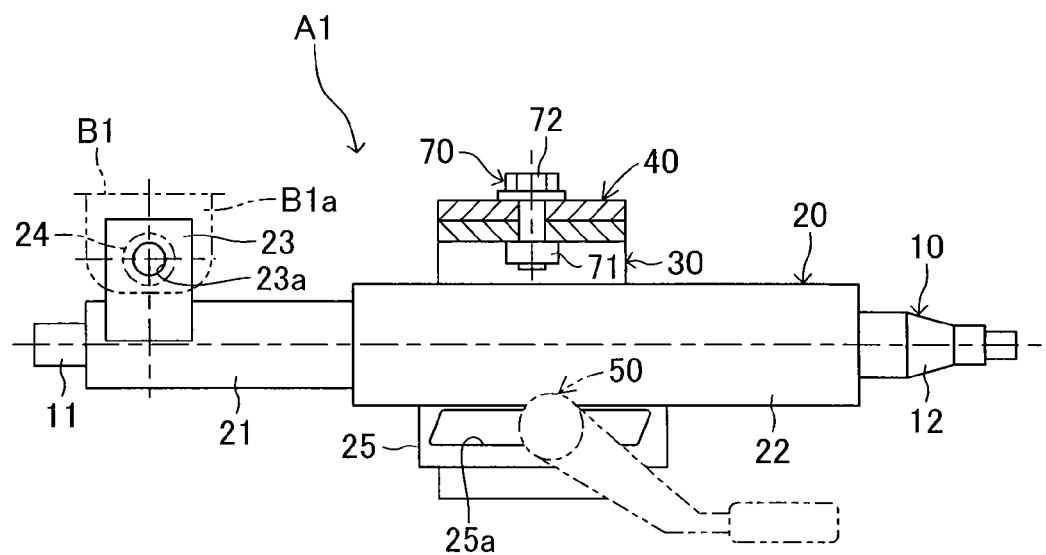
FIG. 2 is a side view of the steering column device illustrated in FIG. 1, which is partially cut along a vertical direction.
Figure 3:
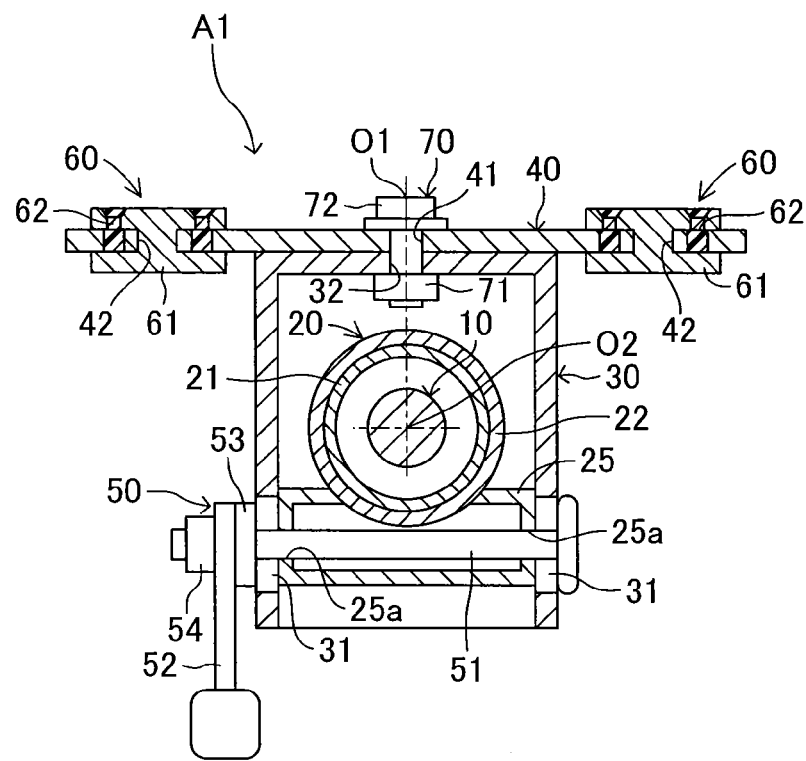
FIG. 3 is a cross-sectional view taken along the line 3-3 of FIG. 1.
Figure 4:
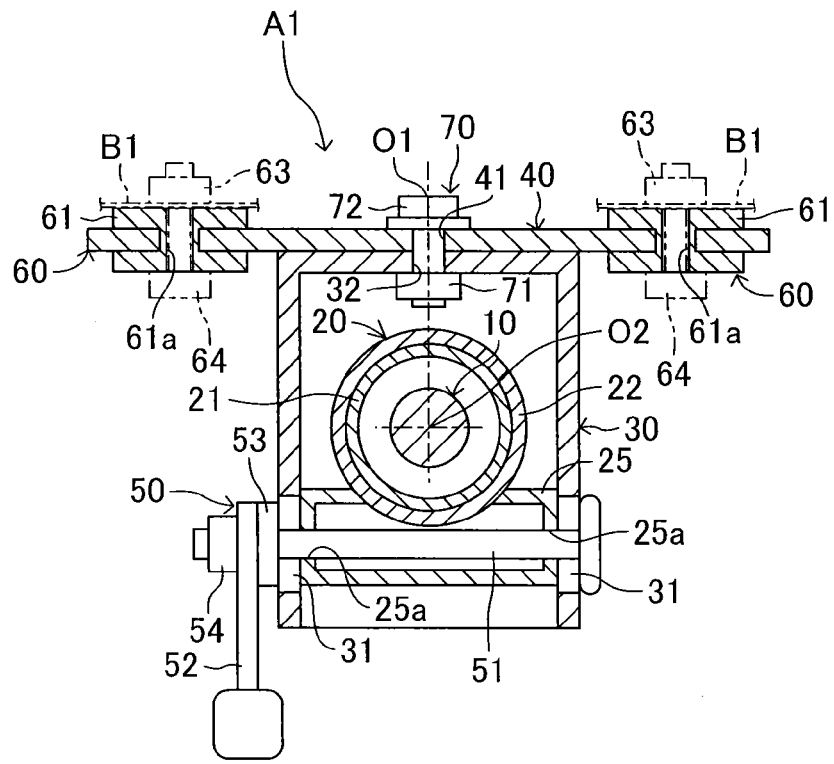
FIG. 4 is a cross-sectional view taken along the line 4-4 of FIG. 1.
Figure 5:
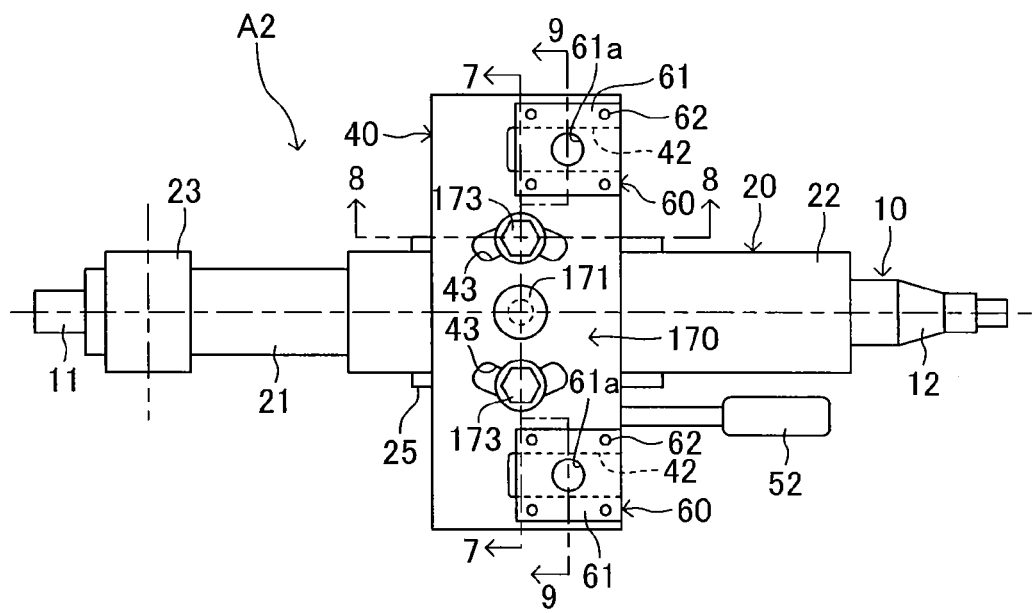
FIG. 5 is a schematic plan view of a steering column device according to a second embodiment of the present invention.
Figure 6:
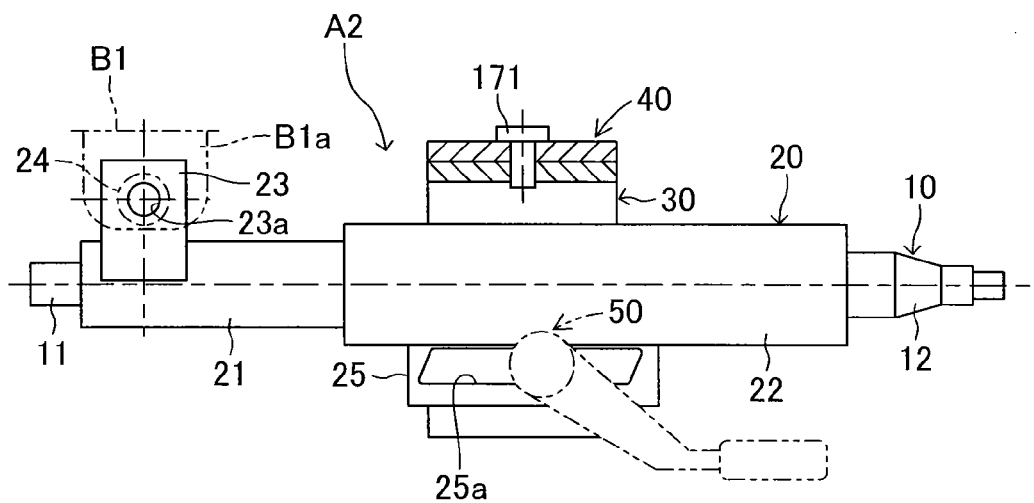
FIG. 6 is a side view of the steering column device illustrated in FIG. 5, which is partially cut along a vertical direction.
Figure 7:
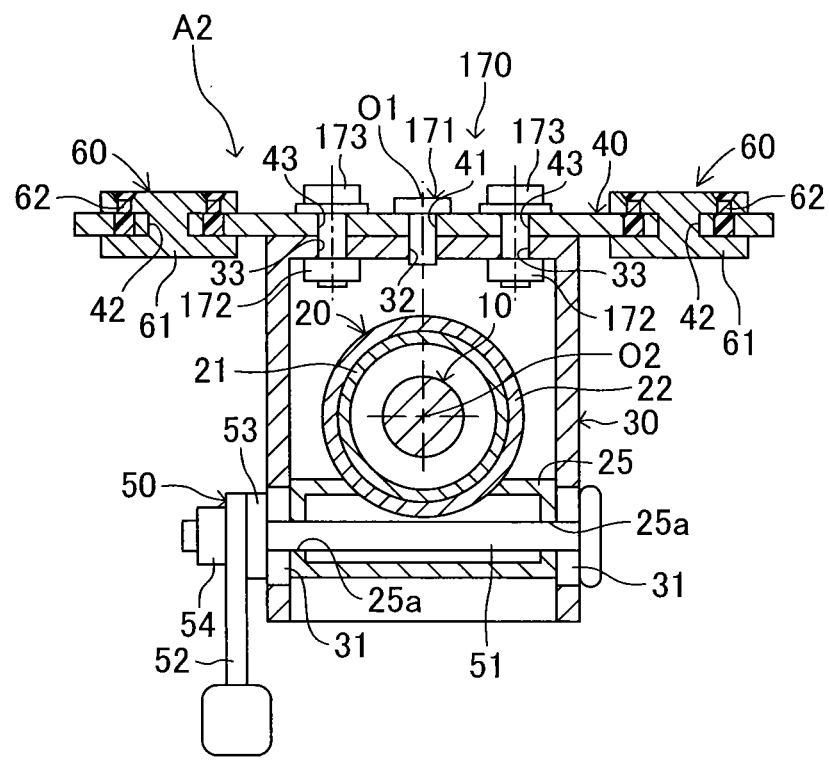
FIG. 7 is a cross-sectional view taken along the line 7-7 of FIG. 5.
Figure 8:
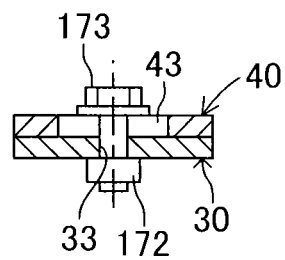
FIG. 8 is a cross-sectional view taken along the line 8-8 of FIG. 5.
Figure 9:
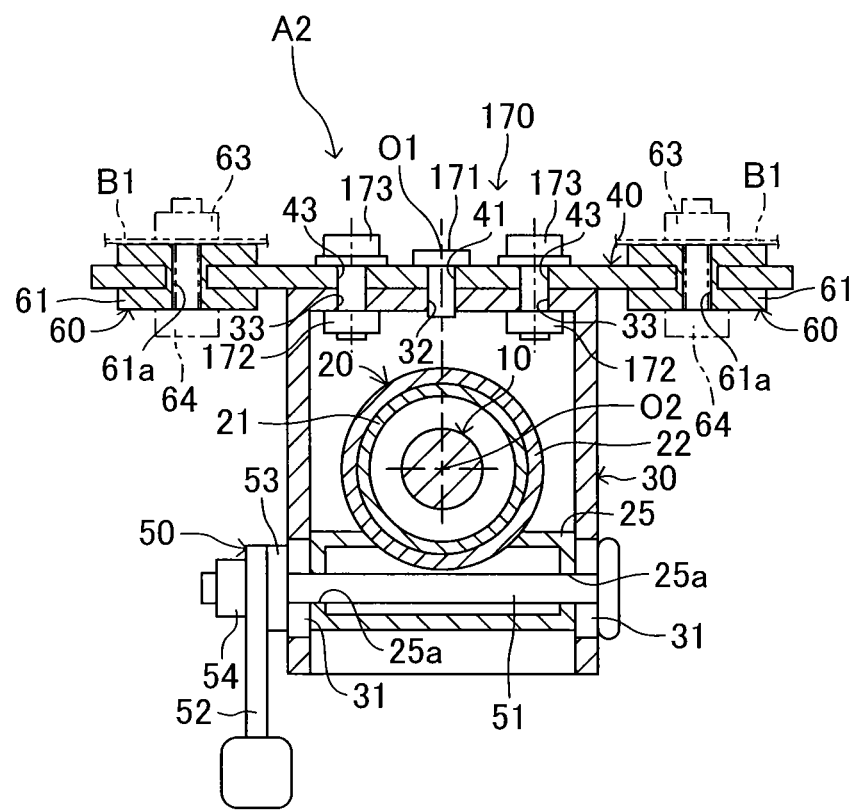
FIG. 9 is a cross-sectional view taken along the line 9-9 of FIG. 5.

The coupling mechanism 70 includes the nut 71 fixed onto the first bracket 30 in advance, and a bolt 72 threadedly fixed onto the nut 71 while being inserted through the mounting hole 41 of the second bracket 40 and the mounting hole 32 of the first bracket 30 when the first bracket 30 and the second bracket 40 are coupled to each other (see FIGS. 2 to 4). In the coupling mechanism 70, a rotation center O1 of relative rotation, which is performed in the coupling mechanism 70, is set so as to intersect an axis center O2 of the steering shaft 10, and the rotation center O1 is arranged at equal distances from the disengaging mechanisms 60 (see FIGS. 3 and 4).

Further, the coupling mechanism 70 is set so as to allow relative rotation of the first bracket 30 and the second bracket 40 when an external force (load) F2 (F1>F2) exceeding a predetermined value is applied to each of the disengaging mechanisms 60 along the column axis direction under a state before the second bracket 40 (the steering column device A1) is assembled onto the vehicle body B1. The above-mentioned predetermined value is set to be lower than a load value affecting disengagement performance of each of the disengaging mechanisms 60. Clamping torque of the bolt 72 with respect to the nut 71 is increased or decreased for adjustment, and thus the predetermined value can be obtained.

In the steering column device A1 according to the first embodiment configured as described above, under a state before the second bracket 40 of the steering column device A1 is assembled onto the vehicle body B1 through an intermediation of the disengaging mechanisms 60, the steering shaft 10, the column tube 20, the first bracket 30, the second bracket 40, the locking device 50, the disengaging mechanisms 60, the coupling mechanism 70, and the like are integrated with one another (formed into a subassembly). At the time of transportation and the like of the subassembly, the external force (load) may be applied to the capsule 61 of each of the disengaging mechanisms 60.

By the way, in the above-mentioned steering column device A1 according to the first embodiment, at the time of transportation and the like under a state in which the steering shaft 10, the column tube 20, the first bracket 30, the second bracket 40, the locking device 50, the disengaging mechanisms 60, the coupling mechanism 70, and the like are integrated with one another (formed into a subassembly), in a case where the external force (load) is applied to the capsule 61 of each of the disengaging mechanisms 60, when the external force (load) acts along the column axis direction and exceeds the predetermined value (which is set to be lower than the load value affecting the disengagement performance of each of the disengaging mechanisms 60), the coupling mechanism 70 allows the first bracket 30 and the second bracket 40 to perform relative rotation.

Accordingly, the relative rotation of the first bracket 30 and the second bracket 40 allowed by the coupling mechanism 70 can prevent the load affecting the disengagement performance of each of the disengaging mechanisms 60 from being applied to each of the disengaging mechanisms 60. Therefore, even in a case where the first bracket 30 and the second bracket 40 perform relative rotation at the coupling mechanism 70, the first bracket 30 and the second bracket 40 are returned to an original state (state before performing relative rotation), and thus the steering column device A1 can be used as a qualified device as it is. Accordingly, reliability of the steering column device A1 can be ensured, and productivity of the steering column device A1 can be enhanced. Note that, in this case, a reference value (appropriately settable value) may be set for a relative rotation amount of the first bracket 30 and the second bracket 40 at the coupling mechanism 70, and the steering column device may be distinguished as a disqualified device when the relative rotation amount exceeds the reference value.

According to the above-mentioned first embodiment, the predetermined value (load value allowing relative rotation of the first bracket 30 and the second bracket 40) set in the coupling mechanism 70 is set to be lower than the load value affecting the disengagement performance of each of the disengaging mechanisms 60, but the predetermined value can be implemented as the load value affecting the disengagement performance of each of the disengaging mechanisms 60. In this case, under the above-mentioned state, when the external force (load) applied to the capsule 61 of each of the disengaging mechanisms 60 acts along the column axis direction and exceeds the predetermined value (load value affecting the disengagement performance of each of the disengaging mechanisms 60), the coupling mechanism 70 allows the first bracket 30 and the second bracket 40 to perform relative rotation. Accordingly, even when external damage to each of the disengaging mechanisms 60 caused by the external force (load) is small, a displacement amount (relative rotation amount) of an assembling position of the second bracket 40 with respect to the first bracket 30 can be added to a displacement amount of an assembling position of each of the disengaging mechanisms 60 with respect to the second bracket 40, and thus it is possible to increase a displacement amount of the assembling position of each of the disengaging mechanisms 60 with respect to the first bracket 30.

Thus, in this case, the relative rotation of the first bracket 30 and the second bracket 40 can prevent the second bracket 40 from being assembled onto the vehicle body B1 through the intermediation of the disengaging mechanisms 60, and hence a disqualified device can be easily distinguished from qualified devices. Therefore, there is no need to inspect all of the steering column devices for the disengaging mechanisms 60 immediately before each steering column device is assembled onto the vehicle body in order to ensure the reliability of the steering column device A1 (in order to secure the disengagement performance of each of the disengaging mechanisms 60). Thus, the productivity of the steering column device can be enhanced.

Further, in the first embodiment described above, the steering column device is configured so that the above-mentioned predetermined value is obtained in such a manner that the clamping torque of the bolt 72 with respect to the nut 71 is increased or decreased for adjustment in the coupling mechanism 70. However, as in a second embodiment of the present invention illustrated in FIGS. 5 to 9, the steering column device may be configured and implemented so that the above-mentioned predetermined value is obtained in such a manner that clamping torque of a pair of bolts 173 with respect to a pair of nuts 172 is increased or decreased for adjustment in a coupling mechanism 170. Note that, a steering column device A2 according to the second embodiment is the same as the steering column device A1 according to the first embodiment except for the configuration of the coupling mechanism 170, and hence description of the configuration except for that of the coupling mechanism 170, description of operations, and the like are omitted.

The coupling mechanism 170 according to the second embodiment includes a coupling pin 171 inserted through the mounting hole 41 of the second bracket 40 and the mounting hole 32 of the first bracket 30 when the first bracket 30 and the second bracket 40 are coupled to each other, the pair of right and left nuts 172 fixed onto the first bracket 30 in advance, and the pair of right and left bolts 173 threadedly fixed onto the nuts 172, respectively. The nuts 172 are provided on the first bracket 30 so as to respectively correspond to circular mounting holes 33 formed in the first bracket 30. The bolts 173 are threadedly fixed onto the nuts 172, respectively, through circular-arc mounting holes 43 formed in the second bracket 40 and through the circular mounting holes 33 formed in the first bracket 30. In the coupling mechanism 170, the rotation center O1 of relative rotation, which is performed in the coupling mechanism 170, is set so as to intersect the axis center O2 of the steering shaft 10, and the rotation center O1 is arranged at equal distances from the disengaging mechanisms 60. Further, in the coupling mechanism 170, the pair of right and left mounting holes 43 are formed into a circular-arc shape with the rotation center O1 being set as a center of the circular arc, and are arranged at equal distances from the rotation center O1. Further, the pair of right and left nuts 172 and the pair of right and left bolts 173 are arranged at equal distances from the rotation center O1.

Further, in the embodiments described above, the present invention is applied to the steering column device including the steering shaft 10 and the column tube 20 that are supported by the first bracket 30 so as to be adjustable in tilting and telescoping thereof. In a similar manner to the embodiments described above or through appropriate modification thereof, the present invention may also be applied to a steering column device including the steering shaft and the column tube that are not supported by the first bracket so as to be adjustable in tilting and telescoping thereof. Thus, the present invention is not limited to the embodiments described above.

Further, in the embodiments described above, the present invention is applied to the steering column device without a mechanism for absorbing impact energy to be caused by the secondary impact in the event of collision of the vehicle (secondary impact energy absorbing mechanism). In a similar manner to the embodiments described above or through appropriate modification thereof, the present invention may also be applied to a steering column device including the secondary impact energy absorbing mechanism. Thus, the present invention is not limited to the embodiments described above.

Further, in the embodiments described above, the present invention is applied to the steering column device of a type in which the second bracket is disengaged from the vehicle body, and thus the column tube is disengaged from the vehicle body along the column axis direction. In a similar manner to the embodiments described above or through appropriate modification thereof, the present invention may also be applied to a steering column device of a type in which, while the second bracket is fixed onto the vehicle body, the first bracket is disengaged from the second bracket, and thus the column tube is disengaged from the vehicle body along the column axis direction. Thus, the present invention is not limited to the embodiments described above.

The invention claimed is:

1. A steering column device, comprising:
a first bracket for supporting a column tube that supports a steering shaft in a freely rotatable manner;
a second bracket coupled to the first bracket and assembled onto a vehicle body so as to fix the column tube onto the vehicle body; and
disengaging mechanisms provided on a right end portion and a left end portion of the second bracket and configured to allow the column tube to be disengaged from the vehicle body forward along a column axis direction under a set load when a secondary impact is caused in the event of collision of a vehicle,
the first bracket, the second bracket, the and disengaging mechanisms, being integrated with one another under a state before the steering column device is assembled onto the vehicle body,
wherein the first bracket and the second bracket are coupled to each other through an intermediation of a coupling mechanism in a relatively rotatable manner,
wherein a rotation center of relative rotation, which is performed in the coupling mechanism, is set so as to intersect an axis center of the steering shaft, and
wherein the coupling mechanism is set so as to allow the first bracket and the second bracket to perform relative rotation when an external force exceeding a predetermined value is applied to the disengaging mechanisms along the column axis direction under a state before the first bracket, the second bracket, the and disengaging mechanisms, are assembled onto the vehicle body.

2. A steering column device according to claim 1, wherein the predetermined value is set to be lower than a load value affecting disengagement performance of the disengaging mechanisms.

* * * * *